(12) United States Patent
Tsunoda

(10) Patent No.: US 7,840,737 B2
(45) Date of Patent: Nov. 23, 2010

(54) DATA PROCESSOR AND SEMICONDUCTOR INTEGRATED CIRCUITS

(75) Inventor: Takanobu Tsunoda, Kokubunji (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 267 days.

(21) Appl. No.: 11/960,686

(22) Filed: Dec. 19, 2007

(65) Prior Publication Data

US 2008/0172509 A1 Jul. 17, 2008

(30) Foreign Application Priority Data

Jan. 12, 2007 (JP) ............................. 2007-004298

(51) Int. Cl.
*G06F 12/00* (2006.01)
*G06F 13/14* (2006.01)
*G06F 3/00* (2006.01)
*G06F 13/36* (2006.01)
*G06F 13/362* (2006.01)

(52) U.S. Cl. ............................. 710/240; 710/30; 710/38; 710/39; 710/42; 710/113; 710/309; 710/310; 710/316

(58) Field of Classification Search .................. 710/30, 710/38, 39, 42, 113, 115, 240, 241, 309, 710/310, 316
See application file for complete search history.

(56) References Cited

U.S. PATENT DOCUMENTS

| | | | | |
|---|---|---|---|---|
| 6,678,773 B2 * | 1/2004 | Marietta et al. | ............. | 710/200 |
| 6,697,362 B1 * | 2/2004 | Akella et al. | ................ | 370/389 |
| 6,877,072 B1 * | 4/2005 | Dias et al. | ................... | 711/151 |
| 7,062,582 B1 * | 6/2006 | Chowdhuri | ................. | 710/116 |
| 7,136,954 B2 * | 11/2006 | Check et al. | ................ | 710/310 |
| 7,165,094 B2 | 1/2007 | Weber et al. | | |
| 7,281,071 B2 * | 10/2007 | Carey | ......................... | 710/113 |
| 7,296,105 B2 * | 11/2007 | Weber et al. | ................ | 710/241 |
| 7,391,766 B2 * | 6/2008 | Le Maut et al. | ............ | 370/387 |
| 2005/0041688 A1 * | 2/2005 | Bernhard et al. | ............ | 370/473 |

FOREIGN PATENT DOCUMENTS

JP 2004-530197 A 9/2004

* cited by examiner

*Primary Examiner*—Mark Rinehart
*Assistant Examiner*—Jeremy S Cerullo
(74) *Attorney, Agent, or Firm*—Miles & Stockbridge P.C.

(57) ABSTRACT

This invention provide a data processor capable of multiplexing data transfers with desired data transfer characteristics guaranteed, without multiplexing buses. The data processor includes: a transfer path that mutually connects plural processors and plural transfer element circuits such as memory; an arbitration circuit that controls data transfer in the transfer path; and a control register that defines the priority and minimum guaranteed bandwidth of data transfer. The arbitration circuit decomposes data packets sent from plural data transfer sources into subunits, and reconstructs plural data packets having the same data transfer target, based on priority and minimum guaranteed bandwidth stored in a control register. Thereby, the one reconstructed data packet can include subunits of plural data packets from transfer sources having different priorities, and data amounts of subunits contained in it can satisfy minimum guaranteed bandwidth of data transfer.

19 Claims, 9 Drawing Sheets

FIG. 8

| LEN0 | LEN1 | Sub-packet 0 | Sub-packet 1 |
|---|---|---|---|
| 00 | 00 | DTFA | Invalid |
| 00 | 01 | DTFA | DTFB |
| 00 | 10 | DTFA | DTF[B-C] |
| 00 | 11 | DTFA | DTF[B-D] |
| 01 | 00 | DTF[A-B] | Invalid |
| 01 | 01 | DTF[A-B] | DTFC |
| 01 | 10 | DTF[A-B] | DTF[C-D] |
| 10 | 00 | DTF[A-C] | Invalid |
| 10 | 01 | DTF[A-C] | DTFD |
| 11 | 00 | DTF[A-D] | Invalid |
| Others | | Invalid | |

US 7,840,737 B2

DATA PROCESSOR AND SEMICONDUCTOR INTEGRATED CIRCUITS

CLAIM OF PRIORITY

The present application claims priority from Japanese application JP 2007-004298 filed on Jan. 12, 2007, the content of which is hereby incorporated by reference into this application.

FIELD OF THE INVENTION

The present invention relates to a data processor, and technology suitably applied to a semiconductor integrated circuit including a multiprocessor connection buses through which a large number of real-time data transfers are performed in parallel among plural processors.

BACKGROUND OF THE INVENTION

Recently, multimedia processing functions such as images and sounds, and digital devices such as digital versatile disk (DVD) recorders incorporating wired and wireless communication functions have been generally used. These devices are demanded to process at the same time plural real-time tasks such as codec processing, wireless protocol processing, and user interface processing. Therefore, a data processor to control the above devices is usually realized as a system LSI in which plural CPUs (central processing unit), DSP (digital signal processor), a hardware accelerator to perform specific processing are interconnected by on-chip buses.

AS one configuration of high-speed on-chip buses, a split bus transaction non-blocking type bus is known which multiplexes and pipelines bus transactions in an axial direction in time. As a reference document, for example, patent document 1 describes bus configuration of this type.

However, the bus of this type generally allows relatively easy management for data transfer throughput, but has difficulty in guaranteeing transfer latency directly related to real-time capability. Therefore, by including plural sets of on-chip buses to be allocated according to the priority of data transfer, a design to significantly increase a hardware scale because of multiplexing of data transfers in a space direction has been demanded.

[Patent Document 1] Japanese patent laid-open No. 2004-530197

SUMMARY OF THE INVENTION

As described above, multiplex on-chip buses to guarantee data transfer characteristics such as transfer latency causes problems such as reduction in data transfer efficiency, and an increase in power consumption and chip costs as a result of an increase in hardware scale.

An object of the present invention is to provide a data processor capable of multiplexing data transfers with desired data transfer characteristics guaranteed, without multiplexing buses.

The above-mentioned objects and other objects and novel characteristics of the present invention will become apparent from the description of this specification and the accompanying drawings.

Typical inventions disclosed in the present application will be briefly described below.

Specifically, the data processor includes: a transfer path such as a multiprocessor interconnect bus that mutually connects plural processors and plural transfer element circuits such as memory; an arbitration circuit that controls data transfer in the transfer path; and a control register that defines the priority and minimum guaranteed bandwidth of data transfer. The arbitration circuit decomposes data packets sent from plural data transfer sources into subunits, and reconstructs plural data packets having the same data transfer target, based on priority and minimum guaranteed bandwidth stored in a control register. Thereby, the one reconstructed data packet can include subunits of plural data packets from transfer sources having different priorities, and data amounts of subunits contained therein can satisfy minimum guaranteed bandwidth of data transfer. Therefore, without an increase in hardware caused by multiplexing transfer paths, while the real-time capability of data transfer is guaranteed, minimum throughput required for each data transfer can be satisfied.

Typical inventions disclosed in the present application will be briefly described below.

Specifically, without a significant increase in hardware scale, a data processor capable of multiplexing of data transfer while guaranteeing desired data transfer characteristics can be realized.

BRIEF DESCRIPTION OF THE DRAWINGS

FIG. 8 is an explanatory diagram showing the correspondence between data lengths LEN0 and LEN1, and transfer data DTFA to DTFD belonging to each sub-packet;

DETAILED DESCRIPTION OF THE PREFERRED EMBODIMENTS

1. Typical Embodiments

Figure 1:
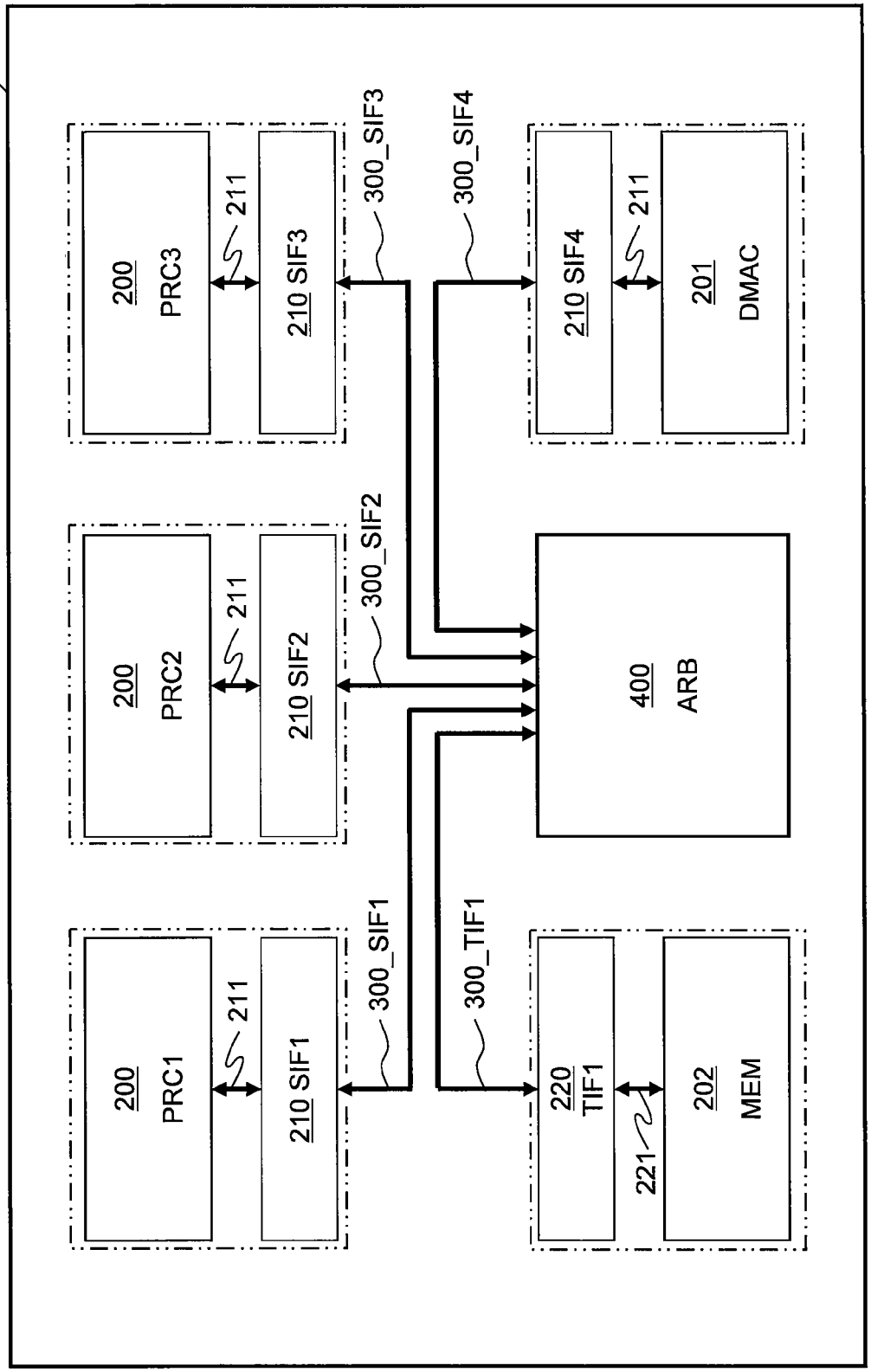
FIG. 1 is a block diagram showing an example of a data processor according to the present invention.

A typical embodiment of the invention disclosed in the present application will be briefly described below. Reference numbers in drawings that are referenced with parentheses in a brief description of the typical embodiment only show things contained in concepts of components to which they are assigned.

(1) A data processing device (100) according to a typical embodiment of the present invention includes: plural transfer element circuits (101 to 105) capable of transferring data; transfer paths (300) used to transfer data packets between the transfer element circuits; and an arbitration circuit (400) that controls data transfer in the transfer paths. The arbitration circuit decomposes data packets outputted from transfer element circuits of transfer sources into subunits, include as many subunits as should be guaranteed for transfer in descending order of transfer priority in plural data packet having the same transfer target to reconstruct another data packet, and sends out the reconstructed data packet to a transfer element circuit of the transfer target. As a result, the reconstructed data packet can contain subunits of plural data packets from transfer sources having different priorities, and the number of the contained subunits can satisfy the number to be guaranteed for transfer for each of data packets from the transfer sources. Therefore, without an increase in hardware caused by multiplexing transfer paths, while the real-time capability of data transfer is guaranteed, minimum throughput required for each data transfer can be satisfied.

As one specific configuration, the data processor includes a memory circuit (428) for defining the transfer priority and the number of subunits to be guaranteed for transfer of the each transfer element circuit. The arbitration circuit refers to the transfer priorities and the number of subunits to be guaranteed for transfer that correspond to the transfer element circuits being output sources of data packets to which the decomposed subunits belong, from the memory circuit. The memory circuit is, for example, rewritable control registers (428A, 428B). By programmably changing the transfer priorities and the number of subunits to be guaranteed for transfer according to the contents of data processing using the transfer element circuits, highly flexible data transfer control is enabled.

As another concrete configuration, the transfer paths include transfer paths (310, 350, 340, 370) from the transfer element circuits to the arbitration circuit, and transfer paths (320, 330, 360) from the arbitration circuit to the transfer element circuits, independently for each of the transfer element circuits. The arbitration circuit includes an input buffer (411), a packet reconstruction unit (421), and an output buffer (441). The input buffer inputs data packets outputted from the transfer element circuits to the transfer paths, and holds them for each of transfer element circuits of transfer targets. The packet reconstruction unit reconstructs subunits of plural data packets held for each of input buffers to another data packet while referring to the transfer priorities and the number of subunits to be guaranteed for transfer that correspond to them. The output buffer holds data packets reconstructed for each of transfer targets and outputs them in parallel to the transfer targets. Thereby, the arbitration circuit can receive plural data packets outputted from plural transfer sources in parallel, and can transfer the data packets reconstructed for each of transfer targets to plural transfer targets. As a result, multiplexing of data transfers can be further promoted.

As a further concrete configuration, the input buffer can hold plural data packets for each of the transfer element circuits. The packet reconstruction unit reconstructs data packets having the same transfer target held in the input buffer so as to satisfy the number of the subunits to be guaranteed for transfer in descending order of the priority.

As a further concrete configuration, when an unallocated field of subunits exists in the data packets reconstructed, the packet reconstruction unit includes subunits of a data packet staying longest in the input buffer in the unallocated field. The data packets reconstructed can be purged of useless fields. If the input buffer is structured to hold plural data packets in FIFO format, a data packet staying longest can be easily extracted.

(2) Although the data processor according to another aspect includes plural transfer element circuits, transfer paths, and an arbitration circuit like the above, the arbitration circuit (400) decomposes data packets inputted from the transfer element circuits into subunits, reconstructs data packets having the same transfer target so as to include as many subunits as satisfy a required transfer data amount in descending order of priority of data transfer, and sends out the reconstructed data packets to a transfer element circuit of the transfer target. Thereby, without an increase in hardware caused by multiplexing transfer paths, while the real-time capability of data transfer is guaranteed, minimum throughput required for each data transfer can be satisfied.

As one concrete configuration, the transfer element circuit includes a circuit that function a bus master such as a processor or a bus slave such as a memory, and an interface circuit for connecting the circuit to the transfer path. The interface circuit absorbs the differences of interface specifications between the individual circuits and the transfer paths.

(3) Although the data processor according to another aspect includes plural transfer element circuits, transfer paths, and an arbitration circuit like the above, the arbitration circuit (400) decomposes plural pieces of data inputted from the transfer element circuits into subunits, reconstructs plural pieces of data having the same transfer target so as to include as many subunits as satisfy a minimum guaranteed transfer throughput in descending order of priority of information transfer, and sends out the reconstructed data to a transfer element circuit of the transfer target. Thereby, without an increase in hardware caused by multiplexing transfer paths, while the real-time capability of data transfer is guaranteed, minimum throughput required for each data transfer can be satisfied.

2. Description of Embodiments

The following details embodiments. Although there is no particular limitation, circuit elements constituting a data processor described below are formed over one semiconductor substrate such as a single-crystal silicon by semiconductor integrated circuit technology such as well-known CMOS transistors and bipolar transistors.

FIG. 1 shows an example of a data processor according to the present invention. A data processor 100 includes, for example, plural processors (PRC1 to PRC3) 200 that execute specific arithmetic processings, respectively, a functional module 201 such as a DMA controller (DMAC), and a main memory (MEM) 202. For data transfer occurring between them, multiprocessor interconnect buses (BUS) 300 are used as transfer pathes. The processors (PRC1 to PRC3) 200 and a DMA controller (DMAC) 201 that are typically shown as bus maters are coupled to the multiprocessor interconnect buses (BUS) 300 via initiator interfaces (SIF1 to SIF4) 210, respectively. The main memory 202 typically shown as a bus slave is coupled to the multiprocessor interconnect buses (BUS) 300 via a target interface (TIF1) 220. Data transfer in the multiprocessor interconnect buses 300 is controlled by a bus arbiter (ARB) 400 as an arbitration circuit.

Although there is no particular limitation, the multiprocessor interconnect buses 300 shown in FIG. 1 have a path separated for each of the initiator interfaces 210 and the target interface 220. In FIG. 1, reference numbers of the multiprocessor interconnect buses 300 are added with suffixes denoting coupling targets to differentiate between the separated paths. Pairs of the processors (PRC1 to PRC3) 200 and the corresponding initiator interfaces (SIF1 to SIF3) 210, a pair of the DMA controller (DMAC) and the corresponding initiator interface (SIF4) 210, and a pair of the main memory 202 and the target interface (TIF1) 220 are regarded as transfer element circuits 101 to 105, respectively.

Figure 2:
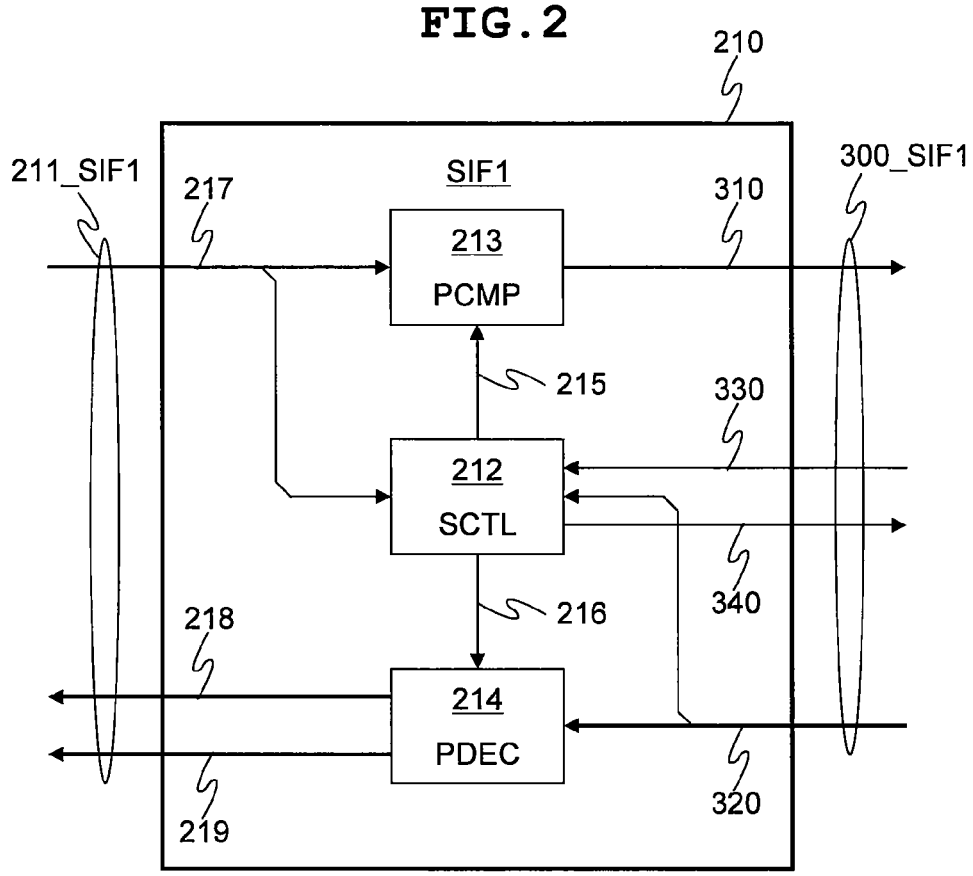
FIG. 2 is a block diagram showing a concrete example of an initiator interface.

FIG. 2 shows a concrete example of one initiator interface (SIF1) 210. The initiator interface 210 includes a transaction control unit (SCTL) 212, a packet composition unit (PCMP) 213, and a packet decomposition unit (PDEC) 214. The transaction control unit 212 controls the packet composition unit 213 and the packet decomposition unit 214 by internal control signals 215 and 216, decomposes a data packet from the multiprocessor interconnect bus 300_SFI1, and supplies the decomposed data packet to a processor interface means 211_SIF1. Moreover, it generates a data packet from data supplied from the processor interface means 211_SFI1, and sends out it to the multiprocessor interconnect bus 300_SFI1. A suffix assigned to the reference number of the processor interface means 211 denotes a coupling target.

More specifically, the initiator interface (SIF1) 210, based on the contents of a bus state signal 330 of the multiprocessor interconnect buses 300 and a data transmission control signal 217 inputted from the processor interface means 211, generates a data packet having a specific format via the packet composition unit 213 controlled by an internal control signal 215, and sends out it to a transmission bus 310. When a data packet having a specific format is inputted from a reception bus 320, the packet decomposition unit 214 controlled by the internal control signal 216 converts the inputted packet into a specific signal including an access address, store data, load data, a store request, and a load request, and outputs it as one or more data reception control signals 218 and 219. More preferably, an operation state of the initiator interface 210 is outputted to a bus arbiter 400 by an internal state signal 340. The bus arbiter 400 determines from the internal state signal 340 whether the initiator interface 210 is outputting signals 218 and 219, using the packet decomposition unit 214. If the signals 218 and 219 are not being outputted, the bus arbiter 400 can supply the data packet from the reception bus 320 to the packet decomposition unit 214. The bus state signal 330 indicates whether the bus arbiter 400 can accept a new data packet via the buses 300. If it can be accepted, the initiator interface 210 outputs the data packet to the transmission bus 310. Although there is no particular limitation, the initiator interface 210 re-outputs the last data packet outputted by the initiator interface 210 to the transmission bus 310 when the bus state signal 330 is in a specific state. Although not shown, other initiator interfaces (SIF2 to SIF4) 210 are also similarly constructed.

Figure 3:
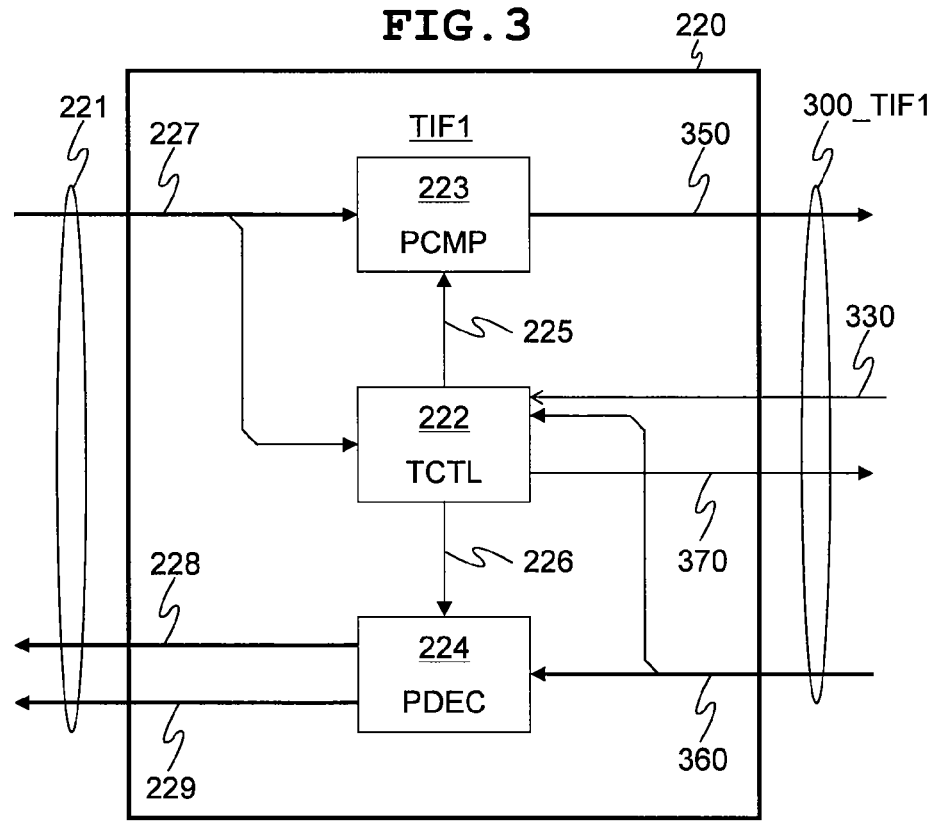
FIG. 3 is a block diagram showing a concrete example of a target interface.

FIG. 3 shows a concrete example of a target interface (TIF1) 220. The target interface 220 includes a transaction control unit (TCTL) 222, a packet composition unit (PCMP) 223, and a packet decomposition unit (PDEC) 214. The transaction control unit 222 controls the packet composition unit 223 and the packet decomposition unit 214 by internal control signals 225 and 226, decomposes a data packet from a multiprocessor interconnect bus 300_TIF1, supplies it to a memory interface means 221, generates a data packet from data supplied from the memory interface means 221, and sends out it to the multiprocessor interconnect bus 300_TIF1.

More specifically, the target interface 220, based on the content of a data transmission control signal 227 inputted from the memory interface means 221, generates a data packet having a specific format via the packet composition unit 223 controlled by the internal control signal 225, and sends out it to a transmission bus 350. When a data packet having a specific format is inputted from a reception bus 360, a packet decomposition unit 224 controlled by the internal control signal 226 converts the inputted packet into a specific signal including an access address, store data, load data, a store request, and a load request, and outputs it as one or more data reception control signals 228 and 229. More preferably, an operation state of the target interface 220 is outputted to the bus arbiter 400 as an internal state signal 370. The bus arbiter 400 determines from the internal state signal 370 whether the target interface 220 is outputting signals 228 and 229, using the packet decomposition unit 224. If the signals 228 and 229 are not being outputted, the bus arbiter 400 can supply the data packet from the reception bus 360 to the packet decomposition unit 224. When the bus state signal 330 indicates that the bus arbiter 400 can accept a new data packet via the buses 300, the target interface 220 outputs the data packet to the transmission bus 350. Although there is no particular limitation, the target interface 220 re-outputs the last data packet outputted by the target interface 220 to the transmission bus 350 when the bus state signal 330 is in a specific state.

Figure 4:
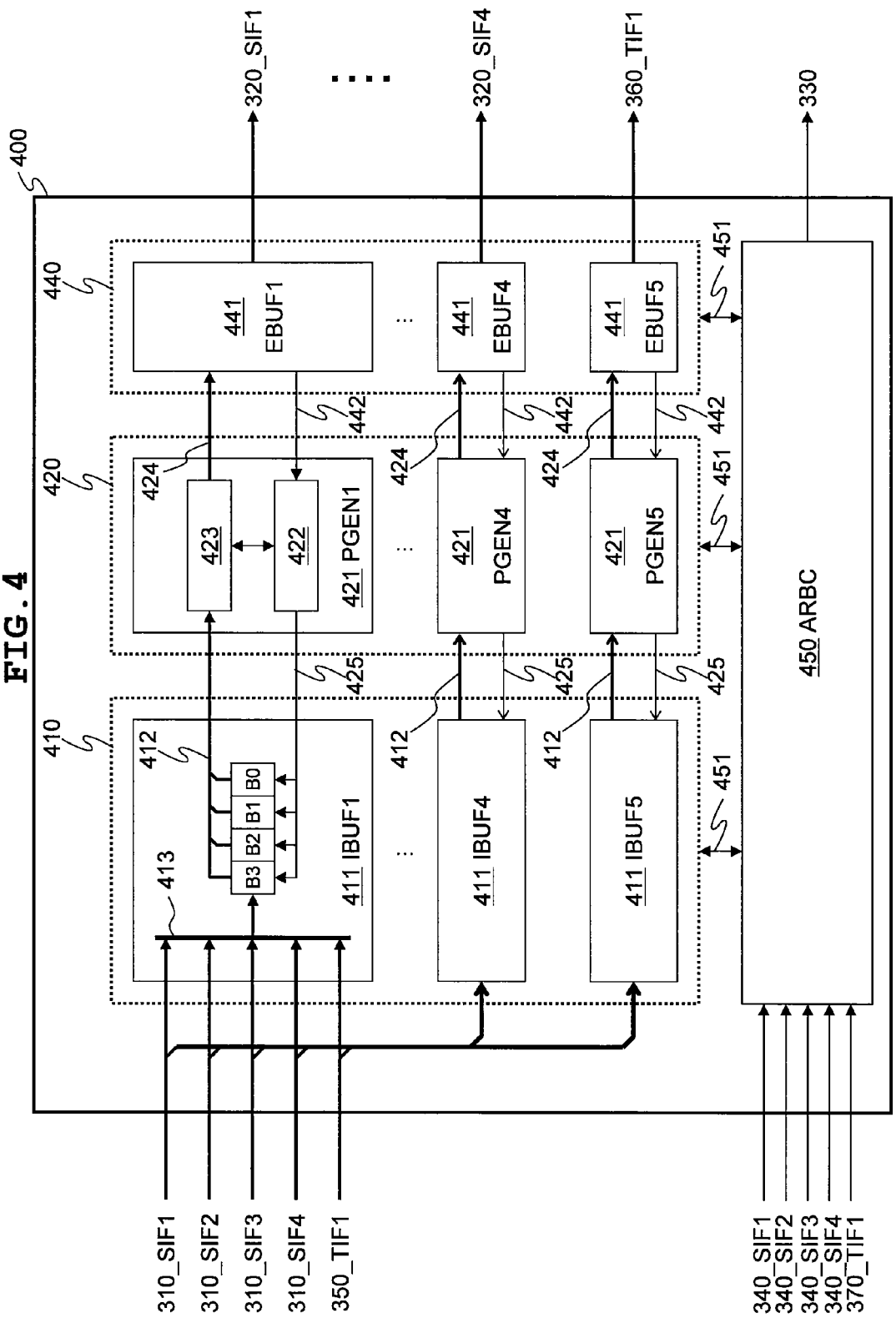
FIG. 4 is a block diagram showing a concrete example of a bus arbiter.

FIG. 4 shows a concrete example of the bus arbiter 400. The bus arbiter 400 relays data packets sent to transmission buses 310 and 350 of the multiprocessor interconnect bus 300, performs conversion into a specific format if required, and then resends out it to the appropriate reception buses 320 and 360. Suffixes assigned to the reference numbers of the transmission buses 310 and 350, and the reception buses 320 and 360 denote coupling targets of the buses. The bus arbiter 400 includes an ingress buffer group 410, packet reconstruction units 420, an egress buffer group 440, and a bus arbitration unit 450. The ingress buffer group 410, packet reconstruction units 420, and egress buffer group 440 respectively include ingress buffers (IBUF1, IBUF2, IBUF3, IBUF4, IBUF5) 411, packet reconstruction units (PGEN1, PGEN2, PGEN3, PGEN4, PGEN5) 421, and egress buffers (EBUF1, EBUF2, EBUF3, EBUF4, EBUF5) 441 that can operate in parallel independently of each of the initiator interfaces (SIF1, SIF2, SIF3, and SIF4) 210 and the target interface 220, which serve as transfer targets.

Data packets inputted from the transmission buses 310_SIF1 to 310_SIF4 and 350, only when code (target identifier) indicating a packet transmission target included in the packets matches codes defined previously in the ingress buffers (IBUF1 to IBUF5) 411, are stored in time series in packets FIFO (B0 to B3) within the relevant ingress buffer 411 by a selection means 413. Thereby, data packets outputted to the transmission buses 310 are delivered to any ingress buffer 411 of the ingress buffer group 410, for each of transmission targets. As a result of this operation, data packets to a transmission target matching a transmission target defined in each of the ingress buffers (IBUF1 to IBUF5) 411 are held in time series in FIFO of the corresponding ingress buffer 411. B0 to B3 are the memory stages of the packet FIFO. The memory stages B0 to B3 each have a bit width for storing a data packet.

The data packets stored in the packets FIFO (B0 to B3) are outputted to the packet reconstruction unit 421 via a corresponding internal bus 412. The packet reconstruction unit 421, according to the contents of an egress buffer state signal 442 and a control register 428, reconstructs a single another data packet (also referred to as data relay packet) having a specific format from one or more data packets, and outputs it from an internal bus 424 to a corresponding egress buffer (EBUF1 to EBUF4) 441. At this time, the packet reconstruction unit 421 outputs an ingress buffer update signal 425 to a corresponding ingress buffer 411 to update a state of the packets FIFO.

The data relay packet stored in the each egress buffer 441 of the egress buffer group 440 is sent out to the reception buses 320 and 360 by control of the bus arbitration unit 450 via an internal control signal 451, based on the contents of the operation state signal 340 of each initiator interface 210 and the operation state signal 370 of the target interface 220. The bus arbitration unit 450 controls the bus state signal 330 indicating whether a new data packet can be accepted, via the multiprocessor interconnect bus 300, and further if necessary, transfers information indicating that the data relay packet has been sent out, to the ingress buffer group 410 and the packet reconstruction units 420 by the internal control signal 451.

The following identifies problems with conventional on-chip buses, and details the construction and operation of the most characteristic packet reconstruction unit 421 of the present invention.

In an on-chip bus multiplexed only in a an axial direction in time, only one specific packet selected at a certain time by a specific means such as priority order occupies the whole of a bandwidth, and packets not selected cannot usually start transactions until transaction of the specific packet terminates. Therefore, in data processors that handle a large volume of stream data such as images and sounds and are required to have high data transfer qualities such as high real-time processing capabilities, design changes have been demanded to form a data processing system having large overhead concerning hardware scale by multiplexing buses themselves (in an axial direction in time) or connecting a large-capacity data buffer sufficiently resistant to fluctuation of data transfer delay to processors and functional modules. On the other hand, in the present invention, while the packet lengths of data relay packets and data transfer packets are kept almost equal to each other, a data area within the packets is split into plural pieces of field data, and a single data relay packet is reconstructed from plural data packets in units of field data (subunit). By this construction, on-chip buses are achieved that have small overhead and facilitate the management of data transfer quality.

It goes without saying that time required to transmit specific packet data on an on-chip bus having a given bit width and operation frequency is proportional to the size of the packet data. When all data contained in plural data packets used for packet reconstruction is integrated to a single packet, transmission time of a reconstructed single data relay packet increases, and data transfer efficiency decreases. In this sense, a method of composing a data relay packet with the packet length of data relay packets almost equal to that of data packets is effective.

Figure 5:
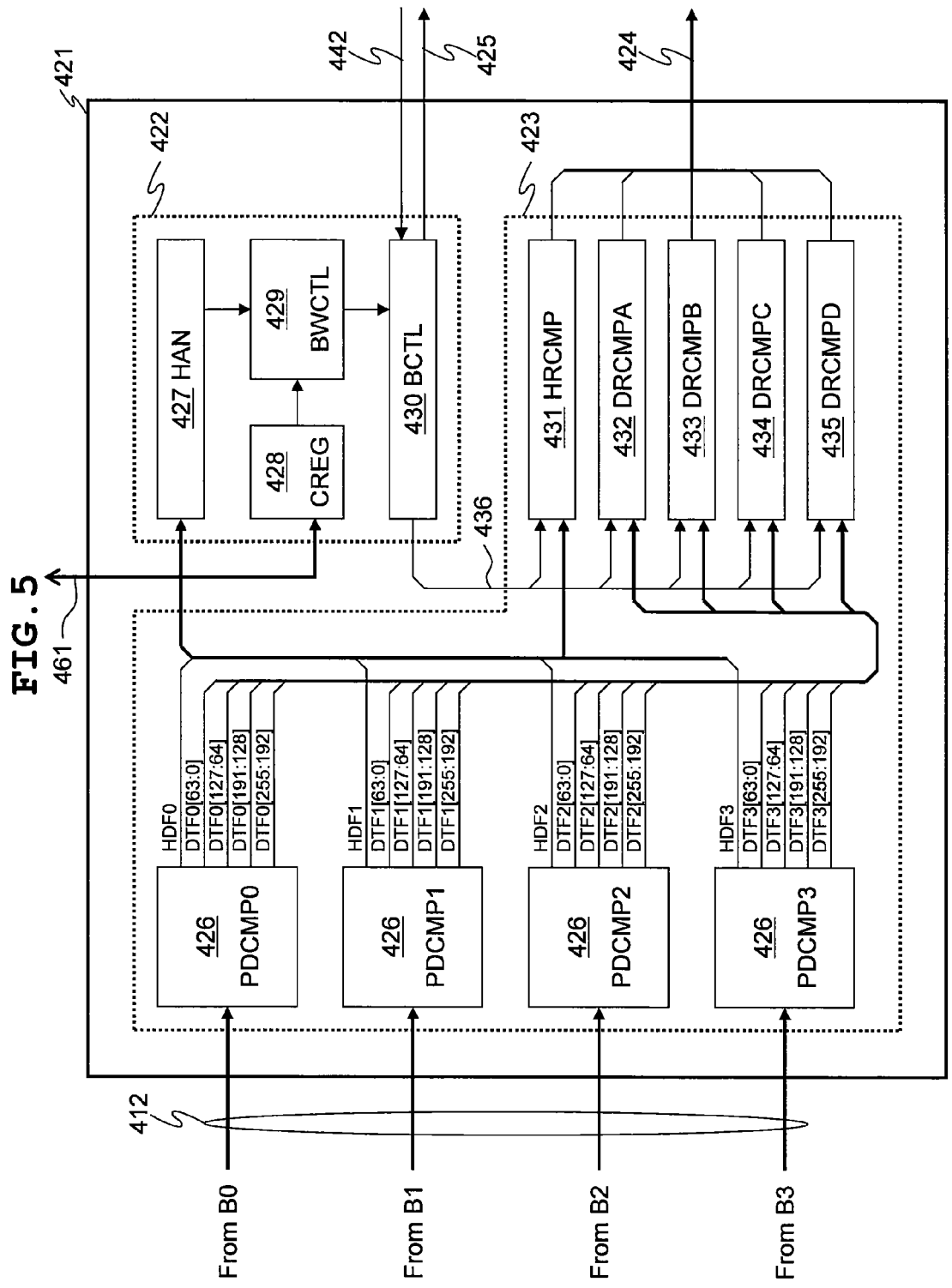
FIG. 5 is a block diagram showing details of a packet reconstruction unit.

FIG. 5 shows details of the packet reconstruction unit 421. The packet reconstruction unit 421 receives plural data packets having the same transmission target stored in packets FIFO within the ingress buffer 411 from the bus 412. For the plural received data packets having the same transmission target, it reconstructs a single data relay packet according to priority and minimum guaranteed bandwidth of each transmission source specified in the control register (CREG) 428 by a packet reconstruction control circuit 422 and a packet reconstruction circuit 423. The packet reconstruction control circuit 422 includes a header analysis circuit (HAN) 427, the control register (CREG) 428, a bandwidth control circuit (BWCTL) 429, and a reconstruction control signal generation circuit (BCTL) 430. The packet reconstruction circuit 423 includes a packet decomposition circuit (PDCMP0, PDCMP1, PDCMP2, PDCMP4) 426, a header reconstruction circuit (HRCMP) 431, and data field reconstruction circuits (DRCMPA, DRCMPB, DRCMPC, DRCMPD) 432 to 435.

Plural data transfer packets having the same transmission target stored in packets FIFO within the ingress buffer 411 are inputted to the packet decomposition circuit 426 through the bus 412, and decomposed to header parts HDF0 to HDF3, and data parts DTF0 to DTF3. The header analysis circuit 427 analyzes the data transfer sources of the header parts HDF0 to HDF3. The bandwidth control circuit 429, according to header analysis results, and priority and minimum guaranteed bandwidth of each data transfer source stored in the control register 428, decides a data position of subunit within a data packet to be embedded in each data field that constitutes a data part of a data relay packet, and generates a control signal required to reconstruct the data relay packet by the reconstruction control signal generation circuit 430. That is, for plural data packets having the same transfer target, the reconstruction control signal generation circuit 430 generates a control signal 436 for selecting as many subunits as satisfy minimum guaranteed bandwidth in descending order of priority. The header reconstruction circuit 431 and the data field reconstruction circuits 432 to 435, according to the control signal 436 outputted by the reconfiguration control signal generation circuit 430, adds a header part matching the content of the reconstructed packet, and reconstructs the data relay packet by selecting appropriate data within the data packets. The minimum guaranteed bandwidth denotes throughput of data transfer or a data transfer amount.

The control register 428 allows read and write from the processor 200 via a target interface 460 incorporated in the bus arbiter 400. Specifically, by appropriately updating the control signal 461 in response to a read/write request from the transmission bus 310_SIF1, for a read/write request, the content of the control register 428 targeted for writing is updated, and for a read request, a packet constructed based on the content of the control register 428 targeted for reading is outputted to an internal bus 462. Thereby, priority and minimum guaranteed bandwidth are made variable by the processor. By programmably changing the priority and the minimum guaranteed bandwidth according to the content of data processing by use of the processor 200, highly flexible data transfer control is enabled.

Figure 6:
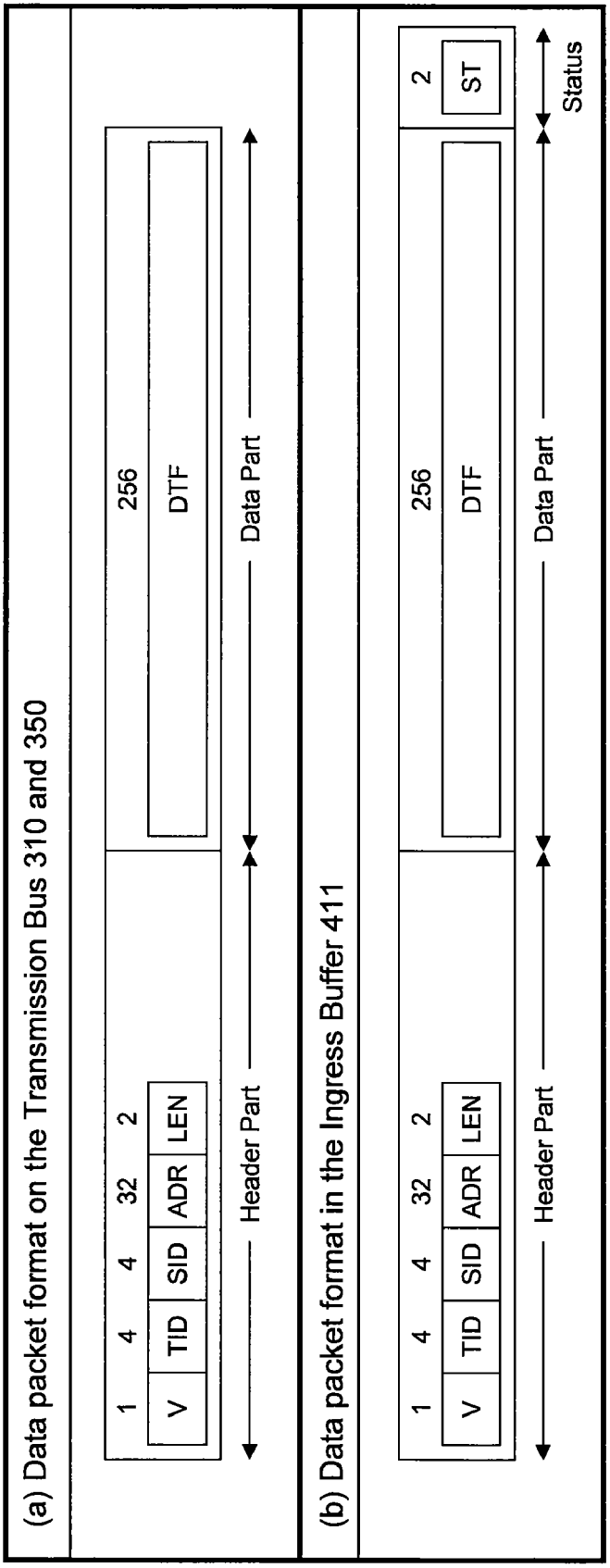
FIG. 6 is a format diagrams showing the format of a data packet (first data packet) within transmission buses 310 and 350, and a data packet (second data packet) within an ingress buffer 411.
Figure 7:
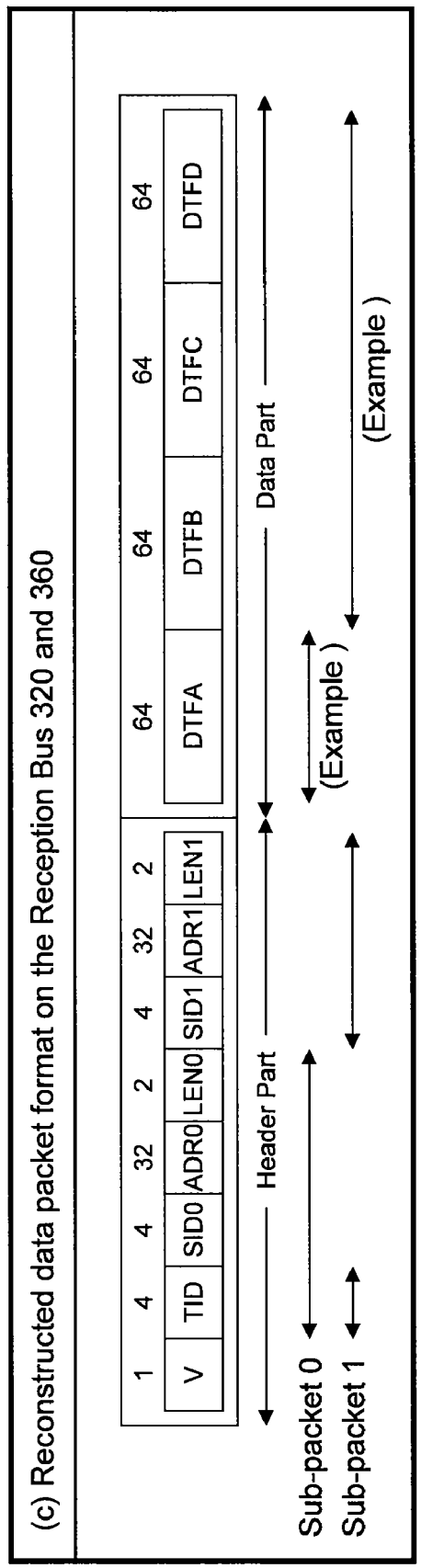
FIG. 7 is a format diagram showing the format of a data relay packet (third data packet) within reception buses 320 and 360.

FIGS. 6 and 7 show the formats of data packets transmitted through the multiprocessor interconnect bus 300 of the present invention.

FIG. 6(*a*) shows the format of a data packet (first data packet) within the transmission buses 310 and 350.

The first data packet includes a data part having a transfer data field DTF that holds transfer data of 256 bits (64 bits×4), and a header part containing plural fields indicating the attribute of the packet. Although not specially limited, the header part contains the following fields: a validity bit V indicating the validity of the packet; a transfer target identifier TID of four-bit code to identify a processor, functional module, or main memory as a packet transfer target; a transfer source identifier SID of four-bit code to identify a processor, functional module, or main memory as a packet transfer source; a 32-bit transfer target start address ADR indicating a transfer target address of data in a start position of transfer data DTF; and two-bit data length LEN indicating the number of pieces of valid data of the transfer data DTF. In the data part of 256 bits (64 bits×4), although there is no particular limitation, data of 64 bits each is designated as a subunit.

FIG. 6(*b*) shows the format of a data packet (second data packet) within the ingress buffer 411.

The second data packet includes a status part that holds a two-bit buffer status ST to indicate a progress status of packet reconstruction, in addition to the packet format shown in FIG. 6(*a*). Thereby, of valid transfer data contained in the data transfer packet, the number of pieces of data having been reconstructed as a data relay packet in the packet reconstruction circuit 423 can be managed.

FIG. 7 shows the format of a data relay packet (third data packet) within the reception buses 320 and 360.

The third data packet includes a data part containing transfer data fields DTFA to DTFD that each hold 64-bit transfer data, and a header part containing plural fields indicating the attributes of the packet. Although there is no particular limitation, the header part contains the following fields: one-bit validity bit V to indicate the validity of the packet; a transfer target identifier TID of four-bit code to identify a processor, functional module, or main memory as a packet transmission target; transfer source identifiers SID0 and SID1 of four-bit codes that identify a processor, functional module, and main memory as transmission sources of first and second pre-reconstruction packets, respectively; 32-bit transfer target start address ADR0 and ADR1 that respectively indicate the transfer target addresses of data in start positions originating in first and second pre-reconstruction packets of transfer data DTFA to DTFD; and two-bit data lengths LEN0 and LEN1 that respectively indicate the number of pieces of valid data originating in first and second pre-reconstruction packets of the transfer data DTFA to DTFD. Hereinafter, pairs of headers and data originating in first and second pre-reconstruction data packets are defined as sub-packets 0 and 1, respectively. Correspondence between data lengths LEN0 and LEN1, and transfer data DTFA to DTFD belonging to the sub-packets is shown in FIG. 8. The number of data transfer packets targeted for reconstruction to a single data relay packet depends on the number of the SID, ADR, and LEN fields; it is a maximum of two in this embodiment. That is, a single data relay packet can hold only data of one data packet of a transfer source, or a mixture of data of two data packets. In an example of FIG. 8, a holding configuration of transfer data by sub-packets 0 and 1 differs depending on the value of four bits of data length LEN0 and LEN1. For example, when LEN0, LEN1=00, 00, sub-packet 0 contains transfer data DTFA, and sub-packet 1 is invalidated. In this case, a data relay packet has a free area of three subunits (192 bits). When LEN0, LEN1=00, 01, sub-packet 0 contains transfer data DTFA, and sub-packet 1 contains transfer data DTFB. In this case, a data relay packet has a free area of two subunits (128 bits).

The bus arbiter 400 reconstructs data transfer packets, based on data transfer priority and minimum guaranteed bandwidth defined by the incorporated control register 428. The following describes a concrete example of the control register 428 and a bandwidth allocation control flow. However, the bandwidth allocation control flow is started when a specific event occurs, for example, a new data transfer packet is stored in an ingress buffer.

Figure 9:
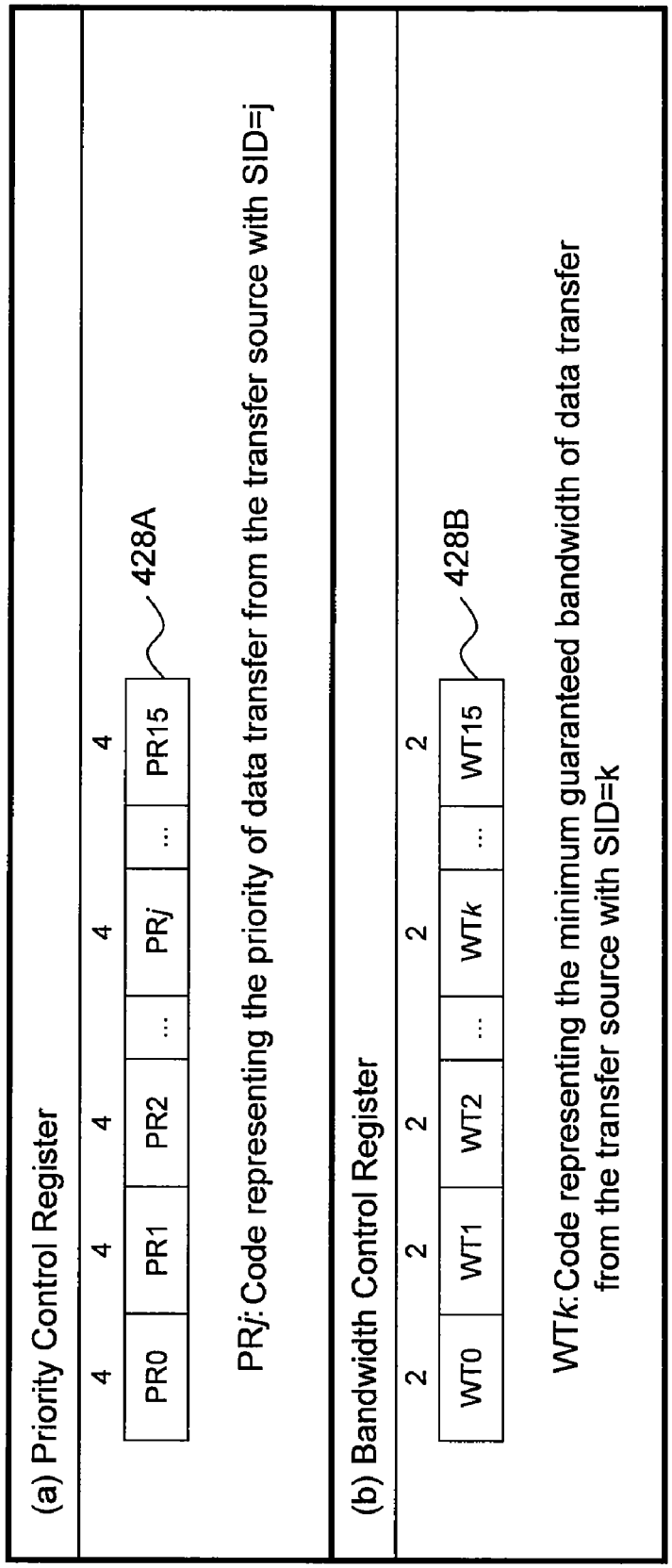
FIG. 9 is an explanatory diagrams showing concrete examples of information held in control registers.

FIG. 9 shows a concrete example of the control register 428. The control register 428 includes two registers. One is a priority control register 428A that defines a data transfer priority from 0 (highest priority) to 15 (lowest priority) for each of four-bit transfer source identifiers to specify a transfer source of data transfer packets. The other is a bandwidth control register 428B that defines minimum guaranteed bandwidth by specifying the number of data fields to be allocated within a data relay packet. Areas PR0 to PR15 shown in the priority control register 428A are four-bit areas specific to a transfer source identified by the sequential transfer source identifier SID, and set to data PRj of priority of a corresponding transfer source. The priority is the highest when the value of the four-bit data PRj is 0, and the lowest when 15. To change the priority of a transfer source, the register 428A has only to be rewritten in the same way as memory access. Areas WT0 to WT15 shown in the band control register 428B are two-bit areas specific to a transfer source identified by the sequential transfer source identifier SID, and set to data WTk of a minimum guaranteed bandwidth of a corresponding transfer source. The data WTk of a minimum guaranteed bandwidth indicates the number of subunits each consisting of 64 bits by its two bits. To change a minimum guaranteed bandwidth of a transfer source, a relevant register 428B has only to be rewritten in the same way as memory access.

Figure 10:
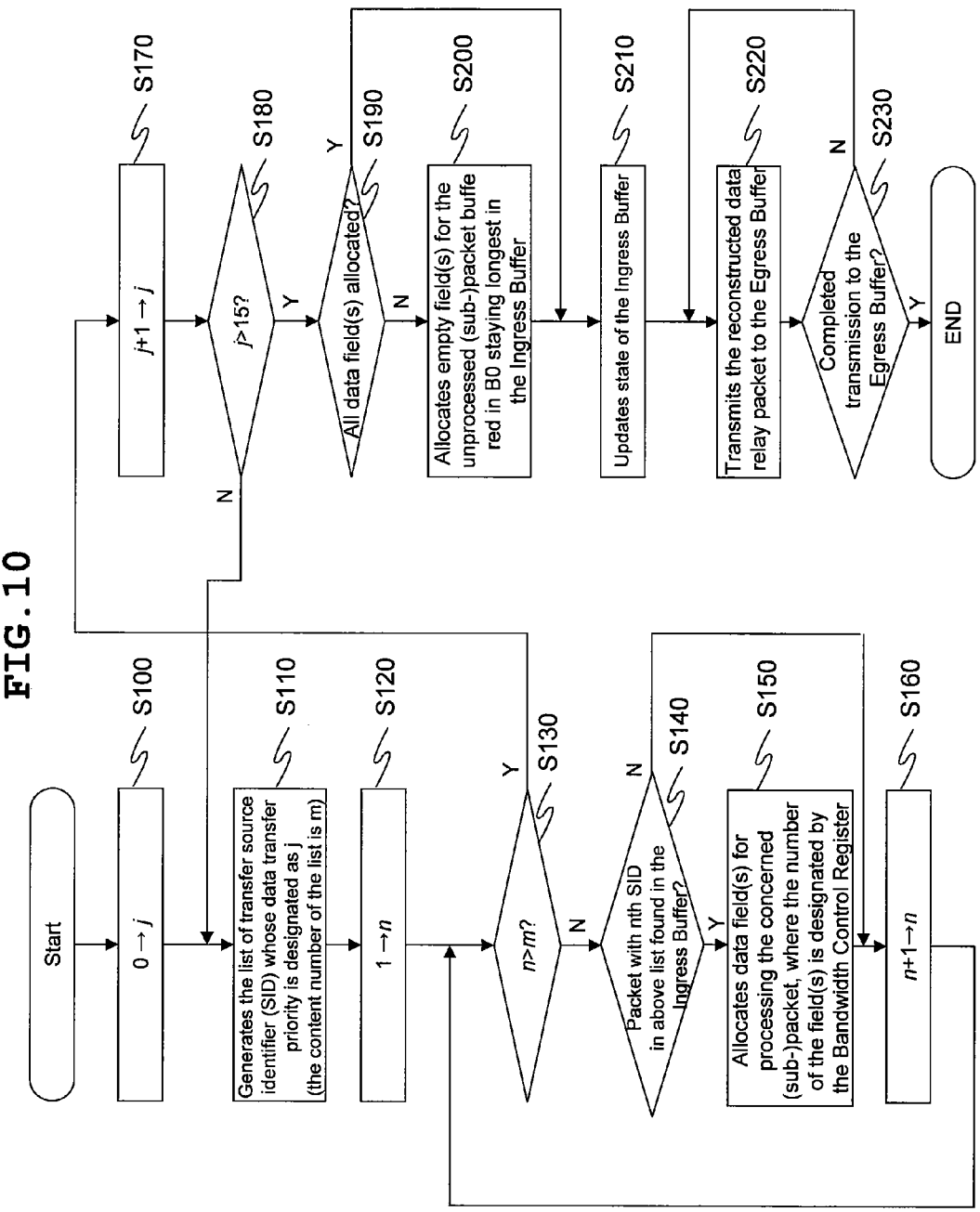
FIG. 10 is a flowchart showing a bandwidth allocation control procedure by a bus arbiter.

FIG. 10 shows a bandwidth allocation control flow in the bus arbiter 400. For all data transfer packets stored in packets FIFO, the bandwidth allocation control allocates as many data fields (subunit) specified in descending order of transfer priority as correspond to a minimum guaranteed bandwidth to a data relay packet, and allocates an extra data field not used for the allocation to a buffer area B0 staying longest in the packets FIFO.

In Step S100, the bus arbiter initializes an internal parameter j indicating transfer priority to a highest priority of 0. In Step S110, it generates a list of fields with data transfer priority designated as j (that is, a transfer source identifier list) of fields within the priority control register 428A (the number of fields having a data transfer priority of j is m). In Step S120, it initializes a loop variable n necessary for loop control below to one.

While the loop variable n becomes equal to m (S130, N), when a field having a data priority of j exists, it checks whether a data transfer packet having SID matching an n-th identifier of the transfer source identifier list is buffered in the packets FIFO. When a match of SID is detected (S140, Y), in Step S150, it allocates as many data fields in the data relay packet as specified in the matching SID field of the bandwidth control register to the data transfer packet. It updates the loop variable n and successively executes the above processing throughout the identifier source identifier list (S160).

On completion of allocation processing for the whole of the transfer source identifier list (S130, Y), in Step S170, the bus arbiter 400 increments the data transfer priority j and repeats the above processing until the content of the data transfer priority j becomes the lowest priority (S180, N).

After the data field allocation processing based on data transfer priority (S180, Y), when an unallocated field exists within the data relay packet (S190, N), in Step S200, it allocates unprocessed data of a data transfer packet in the B0 buffer staying longest in the packets FIFO to the unallocated field.

On completion of the data field allocation processing, the bus arbiter update a buffer state of data transfer packets within the ingress buffer, or shifts the packets FIFO, based on the allocation result (S210), and reconstructs the data relay packet and transfers it to the egress buffer (S220). On completion of transfer (S230, Y), the bandwidth allocation control flow is completed. When the transfer is not completed because of inexistence of a free area within the egress buffer or for other reasons (S230, N), transfer to the egress buffer is retired until completion of the transfer. After a free area occurs in the packets FIFO as a result of the update processing in Step S210, a newly arriving data packet is captured into the ingress buffer 411 to meet a next data transfer request.

Hereinbefore, though the invention made by the inventors of the present invention has been described in detail based on the preferred embodiments, it goes without saying that the present invention is not limited to the preferred embodiments, but may be modified in various ways without changing the main purports of the present invention.

For example, in the above description, a crossbar structure is adopted in the multiprocessor interconnect bus 300 to arbitrarily connect the target interface (TIF1) 220 and the initiator interfaces (SIF1 to SIF4) 210, and the bus arbiter 400 has the function of a crossbar switch circuit as well. In the present invention, transfer paths through which transfer element circuits are connected are not limited to the crossbar structure as described above, and a common bus structure may be adopted to connect transfer element circuits in common. Also in this case, the bus arbiter may have the same construction as shown in FIGS. 4 and 5. However, the signal 330 must be made to function as a signal for notifying the target interface (TIF1) 220 and the initiator interfaces (SIF1 to SIF4) 210 that access does not conflict on the common bus 300. The types and number of the transfer element circuits are not limited to the above description. The present invention is not limited to a one-chip semiconductor integrated circuit. It can also apply to a semiconductor device such as a multichip module.

What is claimed is:

1. A data processor comprising:
   a plurality of transfer element circuits capable of transferring data;
   transfer paths used to transfer data packets between the transfer element circuits; and
   an arbitration circuit that controls data transfer in the transfer paths,
   wherein the arbitration circuit decomposes a data packet outputted from a transfer element circuit of a transfer source into subunits, constructs another data packet including at least a number of subunits corresponding to a minimum guaranteed bandwidth of the transfer source in descending order of transfer priority from data packets having a same data transfer target, and sends out the constructed data packet to a transfer element circuit of the transfer target.

2. The data processor according to claim 1, further comprising a memory circuit for defining the transfer priority and the number of subunits corresponding to the minimum guaranteed bandwidth of each transfer source,
   wherein the arbitration circuit refers to the transfer priority and the number of subunits corresponding to the minimum guaranteed bandwidth of each transfer source to which the decomposed subunits belong defined in the memory circuit.

3. The data processor according to claim 2,
   wherein the memory circuit is a rewritable control register.

4. The data processor according to claim 1,
   wherein the transfer paths include a transfer path from the transfer element circuit to the arbitration circuit, and a transfer path from the arbitration circuit to the transfer element circuit, independently for each of the transfer element circuits, and
   wherein the arbitration circuit includes:
   an input buffer that inputs data packets outputted from transfer element circuits of transfer sources to the transfer paths, and holds the data packets;
   a packet reconstruction unit that reconstructs subunits of the data packets held in the input buffer into reconstructed data packets while referring to the transfer priorities and the number of subunits corresponding to minimum guaranteed bandwidths of the transfer sources; and
   an output buffer that holds the reconstructed data packets and outputs the reconstructed data packets in parallel to transfer elements circuit of transfer targets.

5. The data processor according to claim 4,
   wherein the input buffer can hold the data packets for each of the transfer element circuits, and
   the packet reconstruction unit constructs subunits of data packets having same transfer targets held in the input buffer in descending order of priority.

6. The data processor according to claim 5,
   wherein, when an unallocated field of subunits exists in the reconstructed data packets, the packet reconstruction unit includes subunits of a data packet staying longest in the input buffer in the unallocated field.

7. The data processor according to claim 6,
   wherein the input buffer holds the data packets in FIFO format.

8. The data processor according to claim 1, wherein, when the number of subunits in the constructed data packet is less than a number of subunits which the transfer target can receive, subunits staying longest in the arbitration circuit are added to the constructed data packet.

9. A data processor comprising:
   a plurality of transfer element circuits capable of transferring data;
   transfer paths used for data transfer between the transfer element circuits; and
   an arbitration circuit that controls data transfer in the transfer paths,
   wherein the arbitration circuit decomposes data packets inputted from transfer element circuits into subunits, reconstructs the data packets having same transfer targets so as to include, for each reconstructed data packet, a number of subunits that satisfy a minimum transfer data amount in descending order of priority of data transfer, and sends out the reconstructed data packets to a transfer element circuits of transfer targets.

10. The data processor according to claim 9, comprising a memory circuit for defining the priority of data transfer and the transfer data amount of each transfer element circuit,
    wherein the arbitration circuit refers to the priority and the transfer data amount corresponding to a transfer element circuit being an output source of a data packet to which decomposed subunits belong, from the memory circuit.

11. The data processor according to claim 10,
    wherein the memory circuit is a rewritable control register.

12. The data processor according to claim 9,
    wherein the transfer paths include a transfer path from the transfer element circuit to the arbitration circuit, and a transfer path from the arbitration circuit to the transfer element circuit, independently for each of the transfer element circuits, and
    wherein the arbitration circuit includes:
    an input buffer that inputs data packets outputted from transfer element circuits to the transfer paths, and holds the data packets for transfer element circuits of transfer targets;
    a packet reconstruction unit that reconstructs subunits of the data packets held in the input buffer into reconstructed data packets while referring to corresponding priorities and transfer data amounts; and
    an output buffer that holds the reconstructed data packets, and outputs the reconstructed data packets in parallel to the transfer targets.

13. The data processor according to claim 9,
    wherein, when an unallocated field of subunits exists in the reconstructed data packets, the arbitration unit includes subunits of a data packet held longest by the arbitration circuit among the data packets having the same transfer target in the unallocated field.

14. The data processor according to claim 13,
    wherein the arbitration circuit holds the data packets in FIFO format.

15. The data processor according to claim 14,
    wherein each of the transfer element circuits includes a circuit that functions as a bus master or a bus slave, and an interface circuit for connecting the circuit to the transfer paths.

16. The data processor according to claim 9, wherein, when the number of subunits in the reconstructed data packets is less than a number of subunits which the transfer targets can receive, subunits staying longest in the arbitration circuit are added to the reconstructed data packets.

17. A semiconductor integrated circuit comprising:
a plurality of transfer element circuits capable of transferring data;
transfer paths used for data transfer between the transfer element circuits; and
an arbitration circuit that controls data transfer in the transfer paths,
wherein the arbitration circuit decomposes data packets inputted from the transfer element circuits into subunits, reconstructs the data packets having a same transfer target so as to include at least a number of subunits corresponding to a minimum amount of data transfer in descending order of priority of information transfer, and sends out the reconstructed data packets to transfer element circuits of transfer targets.

18. The semiconductor integrated circuit according to claim 17,
wherein, when an unallocated field of subunits exists in the reconstructed data packets, the arbitration unit includes subunits of data packets held longest by the arbitration circuit among data packets having the same transfer target in the unallocated field.

19. The semiconductor integrated circuit according to claim 17,
wherein, when the number of subunits in the reconstructed data packets is less than a number of subunits which the transfer targets can receive, subunits staying longest in the arbitration circuit are added to the reconstructed data packets.

* * * * *